United States Patent
Ustalov

(10) Patent No.: US 10,198,220 B2
(45) Date of Patent: Feb. 5, 2019

(54) STORAGE RESOURCE PROVISIONING FOR A TEST FRAMEWORK

(71) Applicant: Red Hat Israel, Ltd., Raanana (IL)

(72) Inventor: Larisa Ustalov, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 732 days.

(21) Appl. No.: 13/766,950

(22) Filed: Feb. 14, 2013

(65) Prior Publication Data

US 2014/0229566 A1 Aug. 14, 2014

(51) Int. Cl.
  *G06F 3/06* (2006.01)
  *G06F 11/36* (2006.01)
  *G06F 11/34* (2006.01)

(52) U.S. Cl.
  CPC ............ *G06F 3/067* (2013.01); *G06F 3/0605* (2013.01); *G06F 3/0631* (2013.01); *G06F 3/0665* (2013.01); *G06F 11/3485* (2013.01); *G06F 11/3664* (2013.01); *G06F 11/3433* (2013.01); *G06F 11/3452* (2013.01); *G06F 2201/815* (2013.01)

(58) Field of Classification Search
  CPC ...... G06F 3/067; G06F 3/0631; G06F 3/0665; G06F 11/3664; G06F 11/3672; G06F 2209/5019; G06F 2009/45562; G06F 9/5044; G06F 9/5077; G06F 9/45558; H04L 41/5054; H04L 41/145; H04L 41/5096; H04L 67/1097; H04L 47/78; H04L 9/5055; H04L 9/5072; H04L 9/45558; H04L 11/3684; H04L 11/3688
  See application file for complete search history.

(56) References Cited

U.S. PATENT DOCUMENTS

| | | | |
|---|---|---|---|
| 8,151,048 B1* | 4/2012 | Premkumar et al. | 711/114 |
| 8,533,724 B1* | 9/2013 | Theimer | G06F 9/45558 718/1 |
| 8,862,950 B1* | 10/2014 | Ginsberg | G06F 11/3688 714/25 |
| 9,032,399 B1* | 5/2015 | Yang | G06F 9/45558 718/1 |
| 9,569,235 B1* | 2/2017 | Wang | G06F 9/45533 |
| 2010/0100881 A1* | 4/2010 | Shigeta et al. | 718/1 |
| 2010/0106990 A1* | 4/2010 | Kalman | G06F 1/3221 713/323 |
| 2010/0125477 A1* | 5/2010 | Mousseau | G06F 9/5072 717/177 |
| 2011/0055714 A1* | 3/2011 | Vemulapalli | G06F 9/5077 715/739 |

(Continued)

*Primary Examiner* — Dustin Nguyen
(74) *Attorney, Agent, or Firm* — Lowenstein Sandler LLP

(57) ABSTRACT

A method and system for managing storage in a framework for testing a virtual computing system including one or more virtual machines (VMs). The framework includes a storage provisioning module for receiving storage parameters relating to the testing of the virtual computing system. A target storage server from multiple storage servers for use in execution of the automated test is identified and a storage device is allocated on the target storage server based on the storage parameters. The storage provisioning module communicates with the target storage server and/or storage devices to perform a storage management action relating to the automated test.

17 Claims, 5 Drawing Sheets

(56) References Cited

U.S. PATENT DOCUMENTS

| | | | |
|---|---|---|---|
| 2012/0059919 A1* | 3/2012 | Glaser | G06F 11/3664 709/223 |
| 2012/0198151 A1* | 8/2012 | Kato et al. | 711/114 |
| 2013/0024481 A1* | 1/2013 | Bolesta | G06F 3/0665 707/812 |
| 2013/0054703 A1* | 2/2013 | Neill | G06F 9/5055 709/206 |
| 2013/0132774 A1* | 5/2013 | Somendra | G06F 11/3688 714/32 |
| 2013/0166504 A1* | 6/2013 | Varkhedi | G06F 17/30581 707/610 |
| 2013/0191105 A1* | 7/2013 | Abdirashid et al. | 703/21 |
| 2013/0212577 A1* | 8/2013 | Nayak et al. | 718/1 |
| 2014/0068410 A1* | 3/2014 | Dolinina | G06F 11/3684 715/234 |

\* cited by examiner

STORAGE RESOURCE PROVISIONING FOR A TEST FRAMEWORK

TECHNICAL FIELD

Embodiments of the present disclosure relate to a test framework, and more specifically, to provisioning storage resources in a virtual computing system testing environment.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system." A virtual computing system including multiple virtual machines may require the administration of testing during development and/or prior to deployment using automated testing tools provided by an automation testing framework.

DETAILED DESCRIPTION

Figure 1:
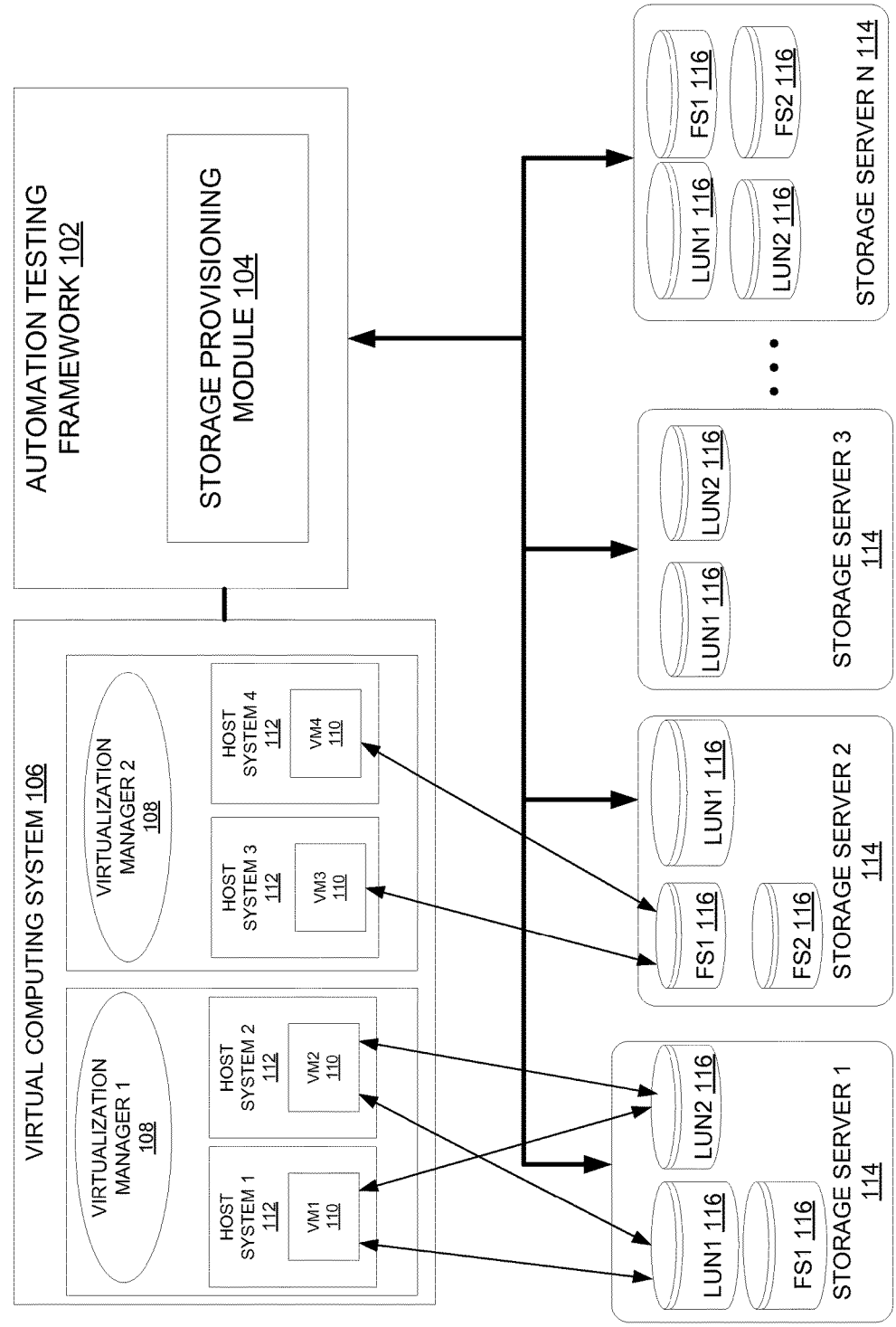
FIG. 1 is a block diagram of an example architecture including an automation testing framework for provisioning storage, according to an embodiment of the present disclosure.

A testing framework provides for testing in connection with the development of a virtual computing system. The testing framework requires storage for the administration of the virtual computing system testing. However, the provisioning of storage and the creation of storage domains required for the provisioning of virtual machines involves the manual creation of storage resources (e.g., logical unit number (LUN) devices, File System (FS) devices, etc.). In particular, storage devices are manually created across multiple storage servers provided by various vendors. In addition, complexities arise when the testing framework supports many different types of storage, storage management types, and different operating system types.

The present disclosure relates to methods and systems for managing storage in a framework for testing a virtual computing system including one or more virtual machines (VMs). Advantageously, the methods and systems support testing of a virtual computing system by providing an automated process for creating storage resources (e.g., allocating space on a storage server) having multiple types of storage and interfacing with storage servers having different types of storage management platforms and/or operating system (OS) types.

The automation testing framework includes a storage provisioning module (e.g., a storage provisioning plug-in application program interface (API)) to create storage resources (e.g., allocating storage domains on a storage server) for the provisioning and testing of the one or more VMs. The storage provisioning module performs various storage management actions, including the creation of storage devices (e.g., LUN devices, FS devices, etc.), the removal of storage devices, the mapping and unmapping of the storage devices, the mapping and unmapping of a client from a storage group (e.g., a logical group containing node names of one or more initiators that may be mapped to one or more LUNs, such that the one or more LUNs are visible to the one or more initiators added to the storage group), the acquisition of storage device information, and/or the identification of available storage devices, etc.

The storage provisioning module supports a variety of storage types and protocols (e.g., Network File System (NFS), Internet Small Computer System Interface (iSCSI), Fibre Channel Protocol (FCP), etc.), interface with multiple types of storage server vendors (including third-party vendors), frameworks and management platforms (e.g., ZFS over Open Solaris, Gluster FS, Netapp Volume, Cornstar over Open Solaris, Netapp, EMC, LIO over Red Hat Enterprise Linux (RHEL) 6, LIO over RHEL7/Fedora7, TGT over RHEL6, XtreamIO, etc.)

Accordingly, a method and system for testing a virtual computing environment is provided that enables an automated creation of storage resources on storage servers provided by various vendors (e.g., third party vendors) employing a variety of different management platforms and frameworks. The storage provisioning module provides for the supply of storage in the testing framework in a manner which reduces the need for the manual execution of the storage provisioning requirements by an administrator.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

FIG. 1 is a block diagram that illustrates an example testing environment 100 employing an automation testing framework 102 including a storage provisioning module 104. The automation testing framework 102 and storage provisioning module 104 are configured to provide storage management for the testing of a virtual computing system 106. The virtual computing system 106 includes one or more host systems 112 (e.g., host system 1, host system 2, host system 3 and host system 4 in FIG. 1). A host system 112 may be a server computer, a desktop computer, a mainframe, a workstation, a personal computer (PC), a mobile phone, a palm-sized computing device, etc. Each host system 112 includes one or more virtual machines 110 that use storage provided by storage servers 114. The term "virtual machine" (VM) refers to part of a host system that is visible to a guest, and may include a virtual disk service (VDS) configured to interface with and access the storage servers 114. A virtual machine may include one or more of the following: memory, virtual CPU (e.g., a VCPU), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI). The virtual computing system 106 may provide any suitable virtual machine platform such as, for example, VirtualBox, QEMU, VMWare Workstation, a Xen virtual machine, a Kernel Virtual Machine (KVM), or others.

The virtual computing system 106 may also include one or more virtualization managers 108 configured to manage one or more VMs 110 (e.g., VM1, VM2, VM3, and VM4 shown in FIG. 1) executing on one or more host systems 112 (e.g., host system 1, host system 2, host system 3, and host system 4 shown in FIG. 1). Each virtualization manager 108 can reside on one of the hosts 112 or on a separate computer system, such as, for example, a server computer, a desktop computer, a mainframe, a workstation, a personal computer (PC), a mobile phone, a palm-sized computing device, etc.

The virtual computing system 106 also includes the automation testing framework 102 that may reside on one or more hosts 112 and/or one or more separate computer systems such as a server computer, a desktop computer, a mainframe, a workstation, a personal computer (PC), a mobile phone, a palm-sized computing device, etc., or a combination of a client computer and one or more server computers. In an example, the automation testing framework 102 may include a virtual machine running in a virtualization environment with corresponding physical or virtual storage devices, a non-virtual computing device, or multiple computing devices. In an example, the automation testing framework 102 may be integrated within the virtual computing system 106, or operate as a module that controls all or part of the virtual computing system 106 to cause the VMs 110 and/or the virtualization manager(s) 108 running in the virtual computing system 106 to perform specific actions according to the test.

In an example shown in FIG. 1, the virtual computing system 106 includes virtualization manager 1 configured to manage host system 1 (hosting VM1 110) and host system 2 (hosting VM2). As shown in FIG. 1, the exemplary virtual computing system 106 also includes virtualization manager 2 configured to manager host system 3 (hosting VM3 110) and host system 4 (hosting VM4 110). It is to be appreciated that the virtual computing system 106 may include any number of virtualization managers 108 managing any number of host systems 112 hosting any number of VMs 110.

In an example, the storage provisioning module 104 is a plug-in Application Programming Interface (API) which may be called by the Automation Testing Framework 102 before execution of a test of the virtual computing system 106. In another example, the automation testing framework 102 and the storage provisioning module 104 access the storage servers 114 via a network (not shown in FIG. 1). The network may be a private network (e.g., a local area network (LAN), a wide area network (WAN), intranet, etc.) or a public network (e.g., the Internet).

As shown, the storage provisioning module 104 is configured to communicate with one or more storage servers 114 for the creation of one or more storage devices 116 (e.g., allocating one or more storage space units on the storage server) for storage associated with the testing of the virtual computing system 106.

In an example, a user (not shown in FIG. 1) accesses the automation testing framework 102 to compose a test associated with the virtual computing system 106 via a graphical user interface. As discussed above, the automation test framework 102 may execute on a client machine that is local to the user (e.g., a desktop or a tablet computer), on a machine that is remote to the user (e.g., a server in the virtual computing system 106 representing a data center), or some combination thereof (e.g., a web server that serves a web page to a client browser and where the server and the client browser coordinate to provide functionality to the user). In addition to using a graphical user interface, the user may interact with the automation testing framework 102 via other interfaces, such as touch-based input, voice input, multimodal input, or other input. In an example, the automation testing framework 102 permits multiple users to access the same data simultaneously or at different times.

In an example, the user may provide input (e.g., defining the scope and parameters for the testing associated with the virtual computing system 106) to the automation testing framework 102, which the automation testing framework 102 can store. Alternatively, the user can provide input by selecting a saved file to import (e.g., a local file, a collection of entries in a database, an XML file, or other data format). In an example, the input to the automated testing framework 102 may also specify which testing outputs to track for logging purposes.

The multiple storage servers 114 may employ different protocols such as a Network File System (NFS) protocol, an Internet Small Computer System Interface (iSCSI) protocol, or a Fibre Channel (FC) protocol. Furthermore, the storage servers 114 may be provided by multiple different vendors employing multiple operating systems, such as, for example, an Oracle Solaris ZFS server, a Gluster FS server, an Netapp Infinite Volume server, an Open Solaris Cornstar server, a Netapp server, an $EMC^2$ server, a LIO-RHEL7/Fedora 17 server, a TGT-RHEL6 server, and a XtreamIO server. Advantageously, the storage provisioning module 104 is configured to communicate with a variety of different storage server types, protocols, and operating systems in order to provision the storage to support the testing of the virtual computing system 106.

In an example, the storage provisioning module 104 is configured to perform multiple storage management actions, including, but not limited to, the acquisition and/or receipt of storage parameters (e.g., a storage device type the creation of a storage device 116 on a storage server 114, the removal of a storage device 116 from a storage server 114, the mapping and unmapping of a storage device 116 to/from a VM 110, the mapping and unmapping of a storage device 116 of a VM 110 to/from a storage group (e.g., a logical group of node names associated with one or more initiators that may connect to the one or more LUNs associated with the storage group), the acquisition and/or receipt of storage device 116 information, the acquisition and/or receipt of a list of storage devices 116, the acquisition and/or receipt of storage server information from a storage server 116 (e.g., a CPU load on a storage server, available disk space information).

Advantageously, the automation testing framework 102 and the storage provisioning module 104 manage, supply and coordinate the storage used for the creation of storage devices and/or storage domains needed for the provisioning of virtual machines in connection with the testing of the virtual computing system 106, without requiring manually-intensive involvement by a administrator.

Figure 2:
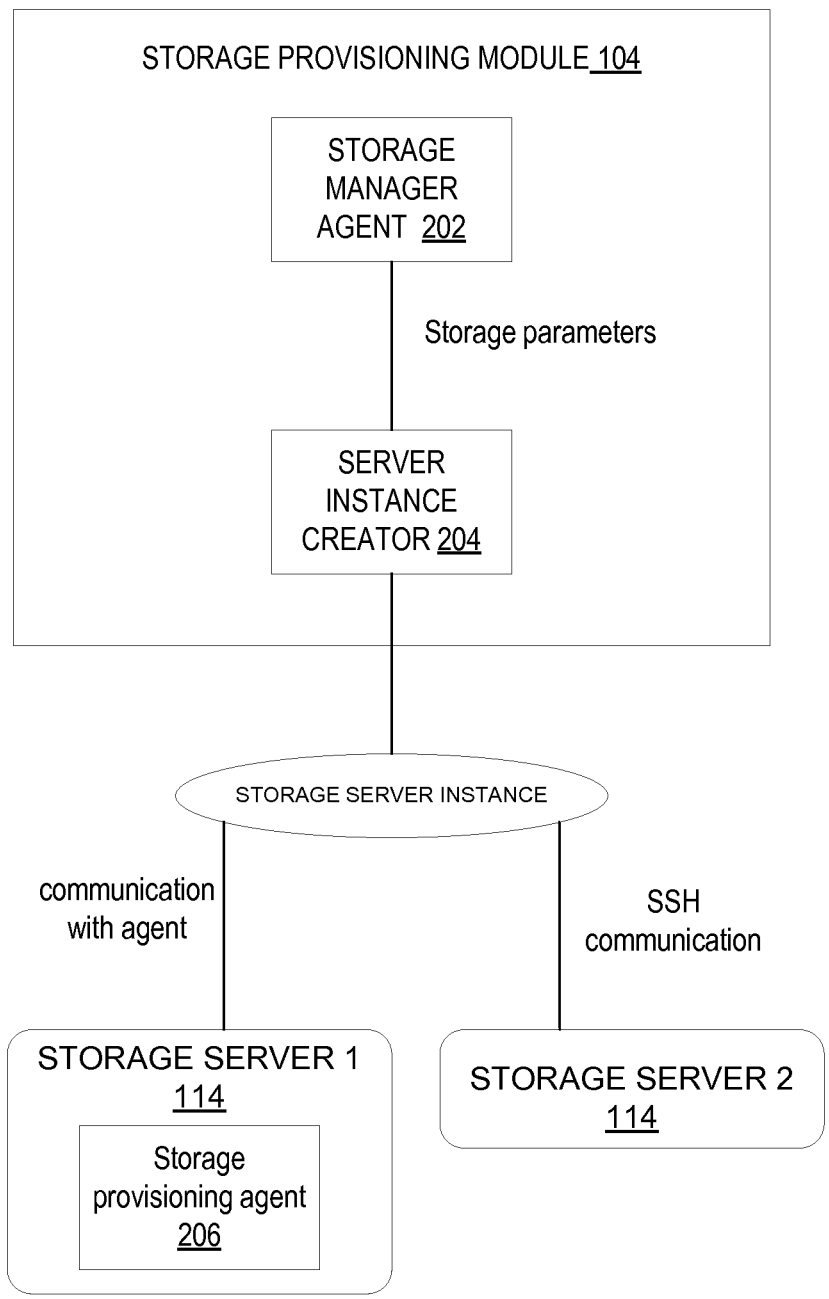
FIG. 2 is a block diagram of an example architecture for provisioning storage in connection with the testing of a virtual computing system, according to an embodiment of the present disclosure.

FIG. 2 illustrates an example storage provisioning module 104 according to embodiments of the present disclosure. As shown in FIG. 2, the storage provisioning module 104 may include a storage manager agent 202 and a server instance creator 204. The storage manager agent 202 communicates with one or more virtual computing systems (e.g., virtual computing system 106 of FIG. 1), a virtualization manager, a client computer, or other system component to collect, determine, receive, extract, and/or identify one or more storage parameters defining desired features, requirements, factors, constraints, options, etc. of the storage needed by the automation testing framework in order to perform testing of a virtual computing system. Example storage parameters include, but are not limited to, a storage device type (e.g., NFS, iSCSI, FCP), a number of storage devices required for the performance of the test, a list of names of an initiator (e.g., an iSCSI client configured to send SCSI commands over an IP network), a vendor type (e.g., Linux, Netapp, etc.), a management protocol/framework type, etc. In an example, the storage parameters may be received from the automation testing framework 102. In a further example, the storage parameters may be received by the automation testing framework from a user (e.g., a tester) via a configuration file.

The storage parameters are provided to the server instance creator 204 configured to create an appropriate storage server instance. The storage server instance is generated in accordance with the storage parameters (e.g., according to the vendor and storage type) and, in an example, encapsulates the required API for communication with one or more storage servers 114.

In an example, the storage server 114 (e.g., a RHEL7/Fedora17 server) may include a storage provisioning agent 206 (e.g., storage server 1 shown in FIG. 2) configured to communicate with the storage server instance via an XML RPC based communication. In another example, in the event the storage server does not include a storage provisioning agent, the storage server 114 may communicate with the storage server instance via a suitable communication protocol, such as, for example, a secure shell (SSH) communication (e.g., as shown in FIG. 2), a simple network management protocol (SNMP) communication. In an example, an object associated with the storage provisioning agent 206 of the storage server 114 is created based on storage server properties, such as the storage server hostname, IP address, and/or storage type. The storage server properties may be defined in a configuration file used by the server instance creator 204 for creation of the appropriate storage server instance.

In an example, the automation test framework executes the automation test using the generated storage server instance(s). For example, a user may employ the storage server instance to call any needed API methods in order to perform the automation test.

Figure 3:
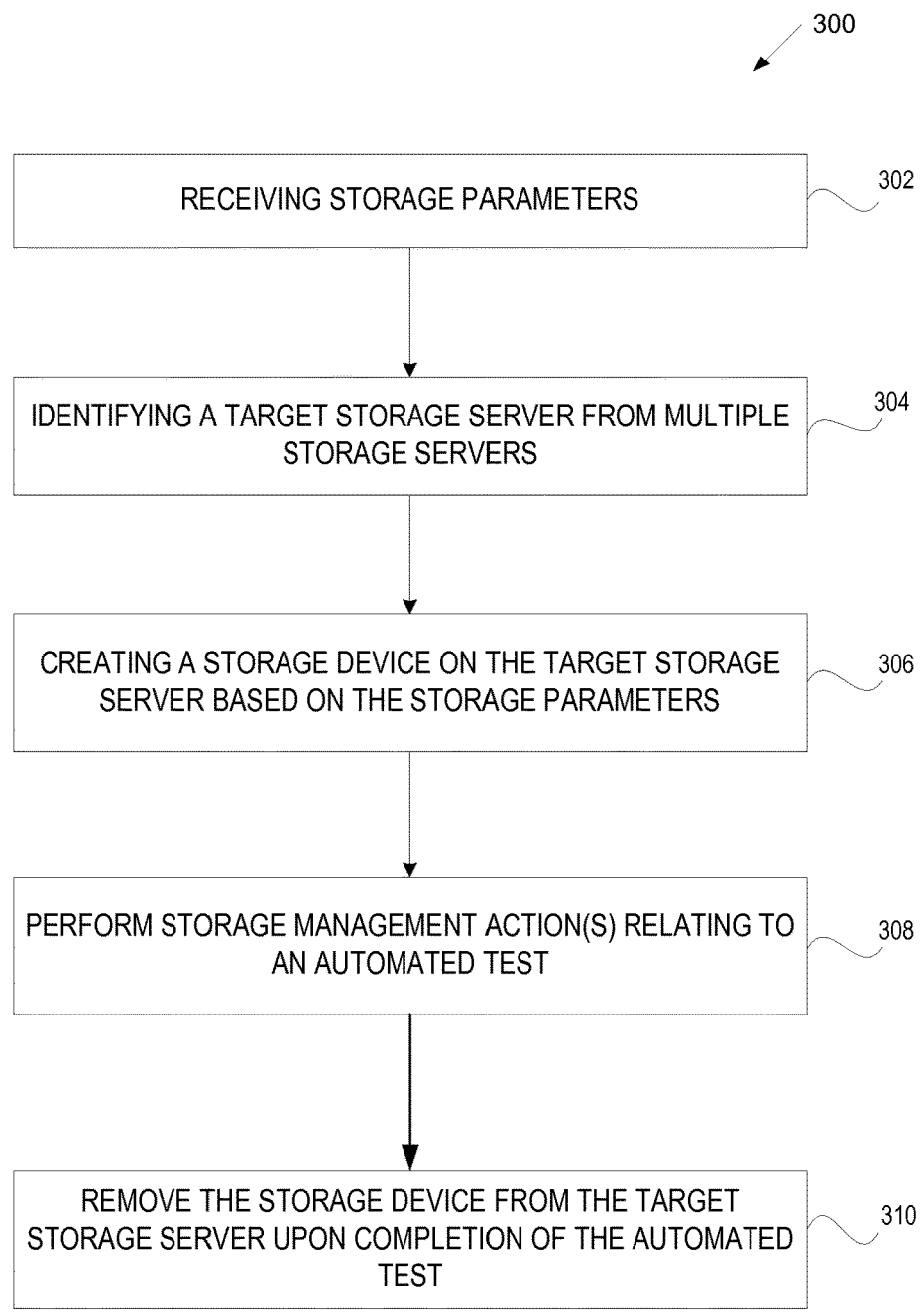
FIG. 3 is a flow diagram of an example method for provisioning storage in connection with the testing of a virtual computing system, according to an embodiment of the present disclosure.

FIG. 3 is a flow diagram illustrating an example of a method 300 for the operation of a storage provisioning module (e.g., the storage provisioning module 104 of FIG. 1). The method 300 may be performed by a computer system 500 of FIG. 5 that may comprise hardware (e.g., circuitry, dedicated logic, programmable logic, microcode, etc.), software (e.g., instructions run on a processing device), or a combination thereof.

In one example, the storage provisioning module may be called by an automation testing framework (e.g., the automation testing framework 102 of FIG. 1) before execution of a test associated with a virtual computing system including one or more virtual machines. In block 302, the storage provisioning module receives one or more storage parameters associated with the storage needed by the automation testing framework in order to perform testing of the virtual computing system. In an example, the storage parameters may be received from the automation testing framework, which may receive the storage parameters from a user (e.g., a tester) via a configuration file.

In block 304, a target storage server from multiple storage servers (e.g., storage server 1, storage server 2, storage server 3 . . . storage server N of FIG. 1) is identified. In an example, in block 304, the one or more target storage servers are identified based on a consideration of a load placed on the storage servers. For example, in block 304, the identified target storage server may be the storage server from among the multiple existing storage servers having the smallest load (as compared to the other servers) presently placed on that server. It is noted that any suitable criteria, test, rule, or condition may be applied in order to select a target storage server.

Figure 4:
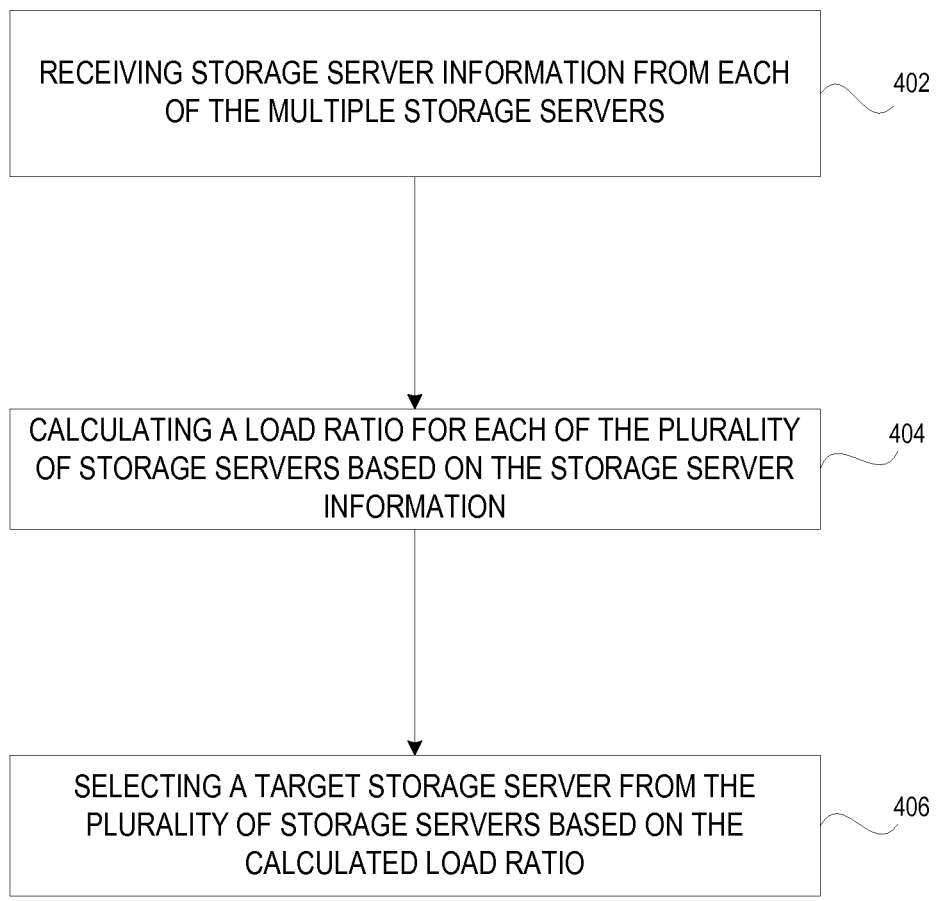
FIG. 4 is a flow diagram of an example method for identifying a target storage server for storage creation from a set of multiple storage servers, according to an embodiment of the present disclosure.

FIG. 4 illustrates an example process for identifying a target storage server in accordance with the present disclosure. As shown in FIG. 4, the storage provisioning module may receive, collect, gather, request, and/or identify storage server information from each of the multiple storage servers in block 402. In an example, the storage server information (e.g., CPU/memory/disk resource usage) may be received by the storage provisioning module via an SNMP service enabled on the storage server. The server information may include any statistics, metrics, measurements, data values, state information, or characteristics associated with a given storage server. In an example, the server information includes a CPU load on the storage server (e.g., a percentage of the CPU of the storage server that is in use at the time the server information is gathered), an amount of disk space available (e.g., a percentage of the disk space of the storage server that is available at a time the server information is gathered/collected), an amount of disk space used (percent of disk usage), etc.

In block 404, a load ratio is calculated for each of the multiple storage servers based on the collected storage server information. In an example, the load ratio may be a ratio of a given storage server's CPU load and the disk space usage (e.g., the amount of the server's disk space in use at a time the server information is collected).

In a further example, one or more of the storage server statistics may be assigned a weight. For example, the available disk space (or disk space usage) may be assigned a greater importance than the CPU load in identifying a target storage server, and as such, the CPU load value may be divided by a selected coefficient (e.g., 2, 3, 4, etc.). For example, the load ratio calculated in block 404 may be equal to (the CPU load/2)+the disk usage value, and the target storage server may be identified by selecting the storage server having the lowest/smallest calculated load ratio, in block 406. If, for example, a first storage server has a CPU load of 15% and a disk usage of 25%, a second storage server has a CPU load of 8% and a disk usage of 50%, and a third storage server has a CPU load of 3% and a disk usage of 75%, then the first storage server is selected in block 406 since it has the smallest calculated load ratio value.

Returning to FIG. 3, in block 306, a storage device is created on the identified target storage server based on the storage parameters (e.g., the storage device type needed, a number of devices needed, a list of initiator names (e.g., for an iSCSI device type). In an example, the storage device is created by allocating a portion of space on the storage server to be used by the client for data storage and input/output operations. For example, in block 306, based on the storage parameters, LUN1, LUN2 and FS1 are created on storage server 1 shown in FIG. 1.

In block 308, the storage provisioning module performs one or more storage management actions relating to the automated test of the virtual computing system. The storage management actions (in addition to creation of the one or more storage devices in block 306) may include, but are not limited to, the removal of storage devices from the one or more target storage servers following completion of the automated testing (in block 310), the mapping and unmapping of the storage devices, the mapping and unmapping of a client from a storage group, the acquisition of storage device information, and/or the identification of available storage devices, etc. For example, if the created storage device is of a suitable type (e.g., iSCSI), the created storage device may be mapped to an associated initiator. In an example, the storage device may be mapped to a storage group thereby making the storage device visible only to the one or more clients (e.g., initiators) included within that storage group. In this example, following performance of the automated testing, the storage device may be unmapped from the initiator. It is noted that any one or more of the storage management actions may be performed by the storage provisioning module in connection with the automated test being administered by the automation testing framework.

Figure 5:
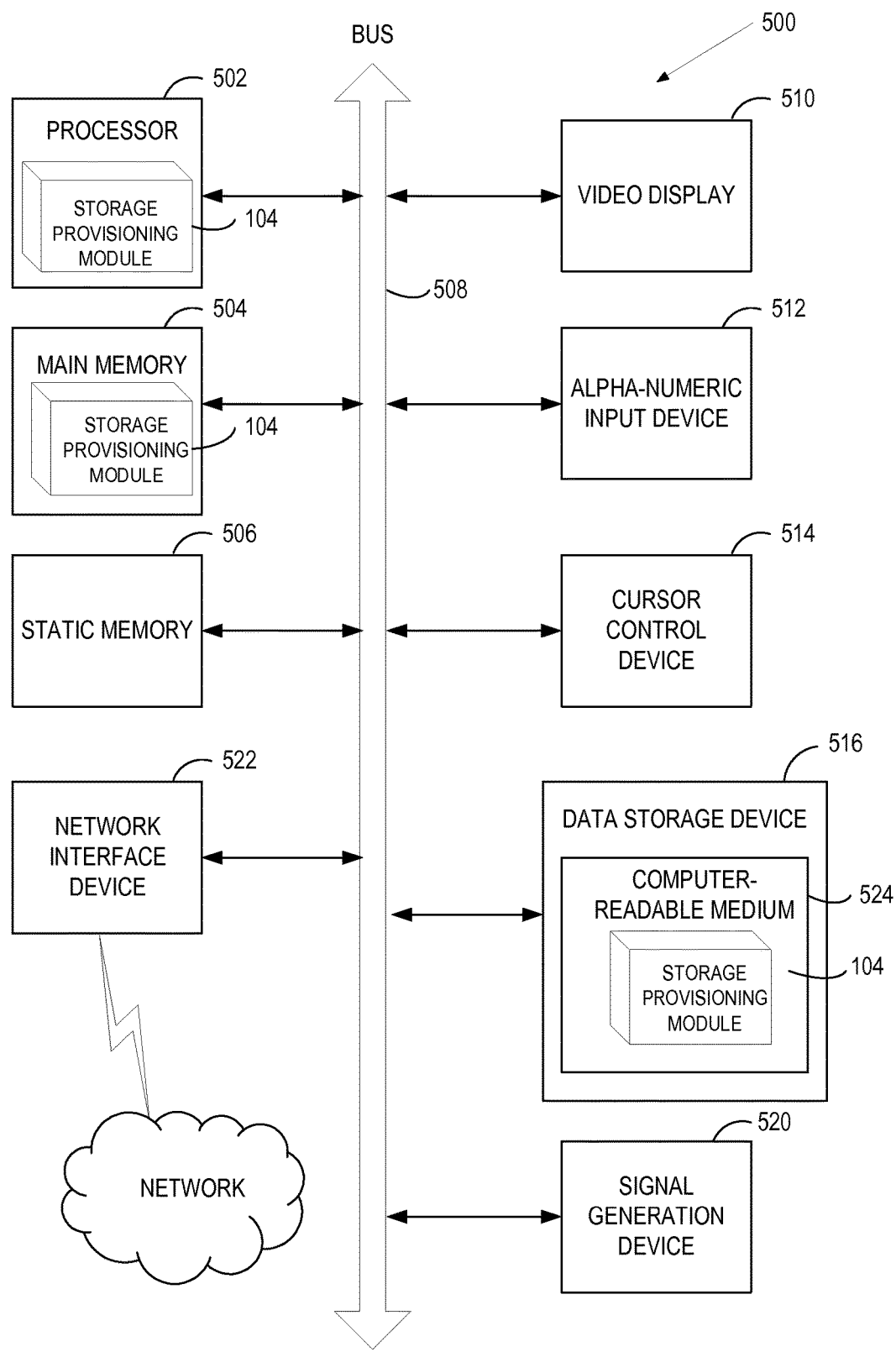
FIG. 5 illustrates a diagrammatic representation of an example storage provisioning system in a testing framework, according to an embodiment of the present disclosure.

FIG. 5 illustrates a diagrammatic representation of a machine in the example form of a computer system 500 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The storage provisioning module 104 shown in FIG. 1 may be executed by processor 502 configured to perform the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

A drive unit 516 may include a computer-readable medium 524 on which is stored one or more sets of instructions (e.g., instructions of the storage provisioning module 104) embodying any one or more of the methodologies or functions described herein. The instructions of the storage provisioning module 104 may also reside, completely or at least partially, within the main memory 504 and/or within the processor 502 during execution thereof by the computer system 500, the main memory 504 and the processor 502 also constituting computer-readable media. The instructions of the storage provisioning module 104 may further be transmitted or received over a network via the network interface device 522.

While the computer-readable storage medium 524 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "allocating", "performing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device, storage parameters identifying storage for performing an automated test of a virtual computing system;
   generating, by the processing device, a storage server instance in view of the storage parameters, wherein the storage server instance comprises a plurality of application program interfaces (APIs) to communicate with a plurality of storage devices of a plurality of storage servers used during execution of the automated test, wherein the plurality of storage servers each have a different type of management platform;
   identifying a target storage server of the plurality of storage servers in view of storage server information received from the plurality of storage servers, wherein the storage server information comprises a central processing unit (CPU) load on each of the plurality of storage servers;
   allocating, via a first API of the plurality of APIs, by the processing device, a first storage device on the target storage server in view of the storage parameters; and
   performing, by the processing device, a storage management action relating to the automated test using the first storage device.

2. The method of claim 1, wherein the storage management action comprises removing the first storage device from the target storage server upon completion of the automated test.

3. The method of claim 1, wherein the plurality of storage servers comprises storage servers provided by a plurality of different entities.

4. The method of claim 1, wherein generating the target storage server comprises:
   calculating, by the processing device, a load ratio for each of the plurality of storage servers in view of the storage server information; and
   selecting, by the processing device, the target storage server from the plurality of storage servers in view of the calculated load ratio.

5. The method of claim 1, wherein the storage parameters comprise at least one of a storage server vendor type, a storage device type, a number of storage devices for execution of the automated test, or an initiator name associated with the virtual computing system.

6. The method of claim 1, wherein the storage management action comprises at least one of mapping the storage device on the target storage server to an initiator associated with the virtual computing system, unmapping the storage device on the target storage server from the initiator associated with the virtual computing system, acquiring storage device information, allocating an additional storage device on the target storage server, removing the additional storage device from the target storage server upon completion of the automated test, or identifying an additional target storage server from the plurality of storage servers.

7. A non-transitory computer readable storage medium comprising instructions that, when executed by a processing device, cause the processing device to:
   receive, by the processing device, storage parameters identifying an amount of storage for performing an automated test of a virtual computing system comprising a plurality of virtual machines, wherein the storage parameters comprise a storage device type;
   generate, by the processing device, a storage server instance in view of the storage parameters, wherein the storage server instance comprises a plurality of application program interfaces (APIs) to communicate with a plurality of storage devices of a plurality of storage servers used during execution of the automated test, wherein the plurality of storage servers each have a different type of management platform;
   identify a target storage server of the plurality of storage servers in view of storage server information received from the plurality of storage servers, wherein the storage server information comprises a central processing unit (CPU) load on each of the plurality of storage servers;
   allocate, via a first API of the plurality of APIs, by the processing device, a first storage device on the target storage server in view of the storage parameters; and
   perform, by the processing device, a storage management action relating to the automated test by communicating with the target storage server according to a protocol associated with the target storage server.

8. The non-transitory computer readable storage medium of claim 7, wherein the plurality of storage devices comprise at least one of a logical unit number (LUN) device or a FS device.

9. The non-transitory computer readable storage medium of claim 7, wherein the storage management action comprises removing the first storage device from the target storage server upon completion of the automated test.

10. The non-transitory computer readable storage medium of claim 7, the processing device to calculate-a load ratio for each of the plurality of storage servers in view of the storage server information, and selecting, by the processing device, the target storage server from the plurality of storage servers having a lowest calculated load ratio.

11. The non-transitory computer readable storage medium of claim 7, wherein the storage parameters comprise at least one of a storage server vendor type, a storage device type, a number of storage devices desired for the automated test, or an initiator name associated with the virtual computing system.

12. A computer system comprising:
a memory to store storage parameters identifying storage for performing an automated test; and
a processing device, operatively coupled with the memory, the processing device to:
generate a storage server instance in view of the storage parameters, wherein the storage server instance comprises a plurality of application program interfaces (APIs) to communicate with a plurality of storage devices of a plurality of storage servers used during execution of the automated test, wherein the plurality of storage servers each have a different type of management platform;
identify a target storage server of the plurality of storage servers in view of storage server information received from the plurality of storage servers, wherein the storage server information comprises a central processing unit (CPU) load on each of the plurality of storage servers;
allocate, via a first API of the plurality of APIs, by the processing device, a first storage device on the target storage server in view of the storage parameters; and
perform a storage management action relating to the automated test by communicating with the target storage server according to a protocol associated with the target storage server.

13. The computer system of claim 12, the processing device to remove the first storage device from the target storage server upon completion of the automated test.

14. The computer system of claim 12, wherein the plurality of storage servers comprises storage servers provided by a plurality of different entities.

15. The computer system of claim 12, the processing device to:
calculate a load ratio for each of the plurality of storage servers in view of the storage server information, and select the target storage server from the plurality of storage servers in view of the calculated load ratio.

16. The computer system of claim 12, wherein the storage parameters comprise at least one of a storage server vendor type, a storage device type, a number of storage devices desired for the automated test, or an initiator name associated with the virtual computing system.

17. The computer system of claim 12, wherein the storage management action comprises at least one of mapping the storage device on the target storage server to an initiator associated with the virtual computing system, unmapping the storage device on the target storage server from the initiator associated with the virtual computing system, acquiring storage device information, allocating an additional storage device on the target storage server, removing the additional storage device from the target storage server upon completion of the automated test, or identifying an additional target storage server from the plurality of storage servers.

* * * * *